US010220968B2

(12) United States Patent
Stumpe et al.

(10) Patent No.: US 10,220,968 B2
(45) Date of Patent: Mar. 5, 2019

(54) GRAIN STORAGE BAG LOADER APPARATUS

(71) Applicant: SIOUX STEEL COMPANY, Sioux Falls, SD (US)

(72) Inventors: Leroy B. Stumpe, Hartford, SD (US); Scott L. Schmidt, Sioux Falls, SD (US)

(73) Assignee: Sioux Steel Company, Sioux Falls, SD (US)

( * ) Notice: Subject to any disclaimer, the term of this patent is extended or adjusted under 35 U.S.C. 154(b) by 322 days.

(21) Appl. No.: 14/832,480

(22) Filed: Aug. 21, 2015

(65) Prior Publication Data

US 2016/0039545 A1     Feb. 11, 2016

Related U.S. Application Data

(62) Division of application No. 12/852,046, filed on Aug. 6, 2010, now Pat. No. 9,137,950.

(51) Int. Cl.
*B65B 1/12* (2006.01)
*A01F 25/14* (2006.01)
*B65B 39/08* (2006.01)

(52) U.S. Cl.
CPC .............. *B65B 1/12* (2013.01); *A01F 25/14* (2013.01); *B65B 39/08* (2013.01); *A01F 2025/142* (2013.01); *A01F 2025/145* (2013.01)

(58) Field of Classification Search
CPC .......... A01F 2025/142; A01F 2025/145; A01F 25/14; B65B 39/08; A01D 51/007
USPC ........... 141/114, 313–315, 231, 391; 53/576, 53/567

See application file for complete search history.

(56) References Cited

U.S. PATENT DOCUMENTS

| 3,791,118 | A | | 2/1974 | Behrens |
| 4,655,128 | A | * | 4/1987 | St. Clair ................. A01F 25/14 100/145 |
| 4,735,242 | A | | 4/1988 | St Clair |
| 5,140,802 | A | | 8/1992 | Inman |

(Continued)

OTHER PUBLICATIONS

Roto-Press Model 1005 Operation and Maintenance Manual, Sioux Automation Center, Inc., Sioux Center, Iowa, May 31, 2008, 50 pages.

(Continued)

*Primary Examiner* — Timothy L Maust
*Assistant Examiner* — Timothy P Kelly
(74) *Attorney, Agent, or Firm* — Jeffrey A. Proehl; Woods, Fuller, Shultz & Smith, PC

(57) ABSTRACT

A bag loader apparatus for filling an elongated bag may comprise a base assembly, and a bag interface assembly for removably mounting a bag thereon and forming a tunnel with a rear opening for fluid communication with the bag. A primary auger assembly has an output opening in communication with the tunnel of the bag interface assembly. In some embodiments, a bag mounting assembly may be configured to lift a bag onto the bag loader apparatus into a position for loading the bag by the apparatus. In some embodiments, a plurality of bag securing elements on the bag interface assembly may be configured to secure a portion of the bag to the bag interface assembly. In some embodiments, an auxiliary auger assembly carried on the base assembly may be configured to feed material into the primary auger assembly.

9 Claims, 13 Drawing Sheets

(56) References Cited

U.S. PATENT DOCUMENTS

| | | | |
|---|---|---|---|
| 5,205,107 A | 4/1993 | Herink | |
| 5,408,809 A | 4/1995 | Cullen | |
| 5,408,810 A * | 4/1995 | Cullen | A01F 25/14 100/100 |
| 5,628,168 A | 5/1997 | Inman | |
| 5,894,871 A | 4/1999 | Greer | |
| 8,205,419 B2 * | 6/2012 | Martinez | A01F 25/14 53/457 |
| 2004/0144067 A1 | 7/2004 | Cullen | |
| 2011/0272062 A1 | 11/2011 | Bartolome Gaviglio | |

OTHER PUBLICATIONS

Roto-Press Model 890 Operation and Maintenance Manual, Sioux Automation Center, Inc., Sioux Center, Iowa, Mar. 11, 2008, 50 pages.

Roto-Pac Model 2990 Operation and Maintenance Manual, Sioux Automation Center, Inc., Sioux Center, Iowa, Feb. 24, 2005, 46 pages.

Roto-Pac Model 2212 Operation and Maintenance Manual, Sioux Automation Center, Inc., Sioux Center, Iowa, Nov. 18, 2005, 139 pages.

Roto-Press Model 804 Operation and Maintenance Manual, Sioux Automation Center, Inc., Sioux Center, Iowa, May 20, 2004, 43 pages.

Roto-Press Model 1004 Operation and Maintenance Manual, Sioux Automation Center, Inc., Sioux Center, Iowa, Mar. 10, 2008, 48 pages.

Roto-Press Model 904 Operation and Maintenance Manual, Sioux Automation Center, Inc., Sioux Center, Iowa, May 17, 2004, 43 pages.

Roto-Pac Model 1990 Operation and Maintenance Manual, Sioux Automation Center, Inc., Sioux Center, Iowa, Jun. 29, 2005, 44 pages.

Roto-Pac Model 2112 Operation and Maintenance Manual, Sioux Automation Center, Inc., Sioux Center, Iowa, Aug. 20, 2002, 85 pages.

Roto-Pac Model 2010 Operation and Maintenance Manual, Sioux Automation Center, Inc., Sioux Center, Iowa, Jun. 29, 2005, 46 pages.

Roto-Pac Model 2212 Operation and Maintenance Manual, Sioux Automation Center, Inc., Sioux Center, Iowa, Nov. 17, 2004, 88 pages.

GBL Hopper Assembly and Installation Instructions, Loftness Specialized Equipment, Hector, Minnesota, Feb. 15, 2012, 12 pages.

Grain Bag Loader GBL 10 Owner's Manual, Loftness Specialized Equipment, Hector, Minnesota, Feb. 20, 2012, 97 pages.

Grain Bag Loader Owner's Manual, Loftness Specialized Equipment, Hector, Minnesota, Aug. 26, 2011, 127 pages.

Technical Specifications—Grain Bagger Mainero 2230, Carlos Mainero y Cia, Bell Ville, Argentina, date unknown, 1 page.

Miller Ag-Bag brochure, copyright 2010, Miller-St. Nazianz Inc., St. Nazianz, Wisconsin, 4 pages.

Miller Ag-Bag G6170 brochure, copyright 2010, Miller-St. Nazianz Inc., St. Nazianz, Wisconsin, 2 pages.

Richiger R-10 Grain Bagger, brochure, Apr. 2009, 2 pages.

Richiger R-9 Grain Bagger, brochure, Apr. 2009, 2 pages.

Richiger R9 Whole Dry Grain Bagger, brochure, Apr. 2009, 4 pages.

* cited by examiner

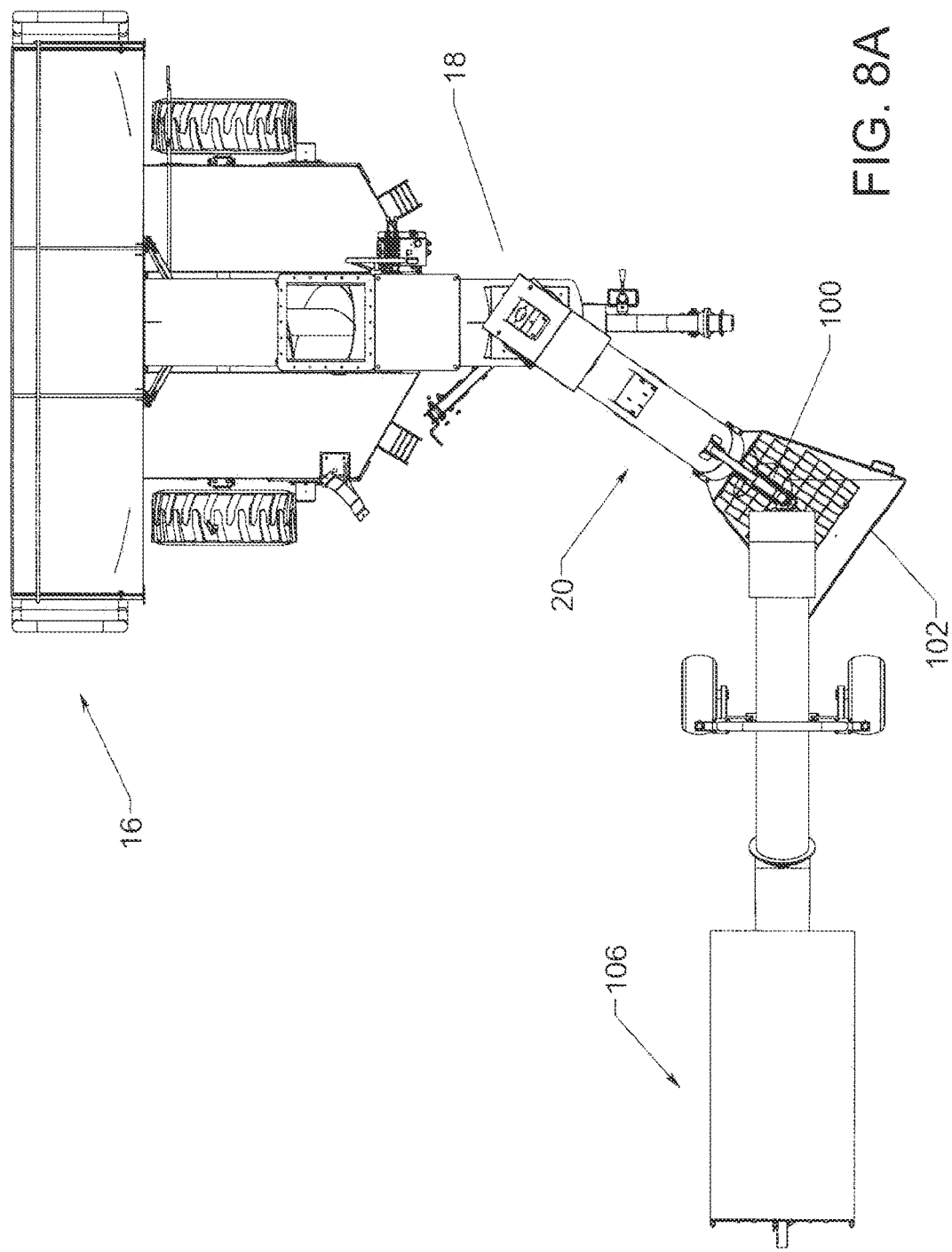

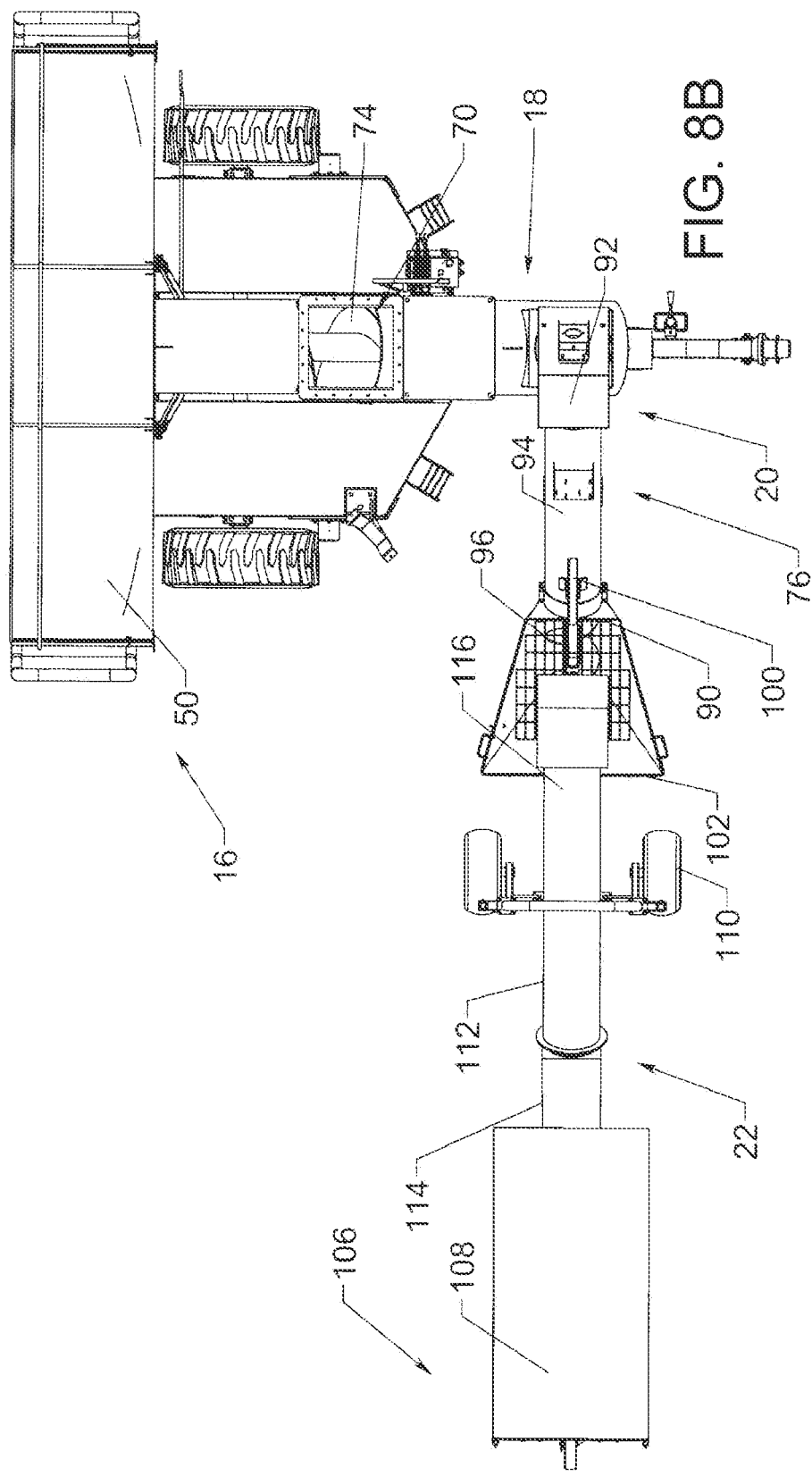

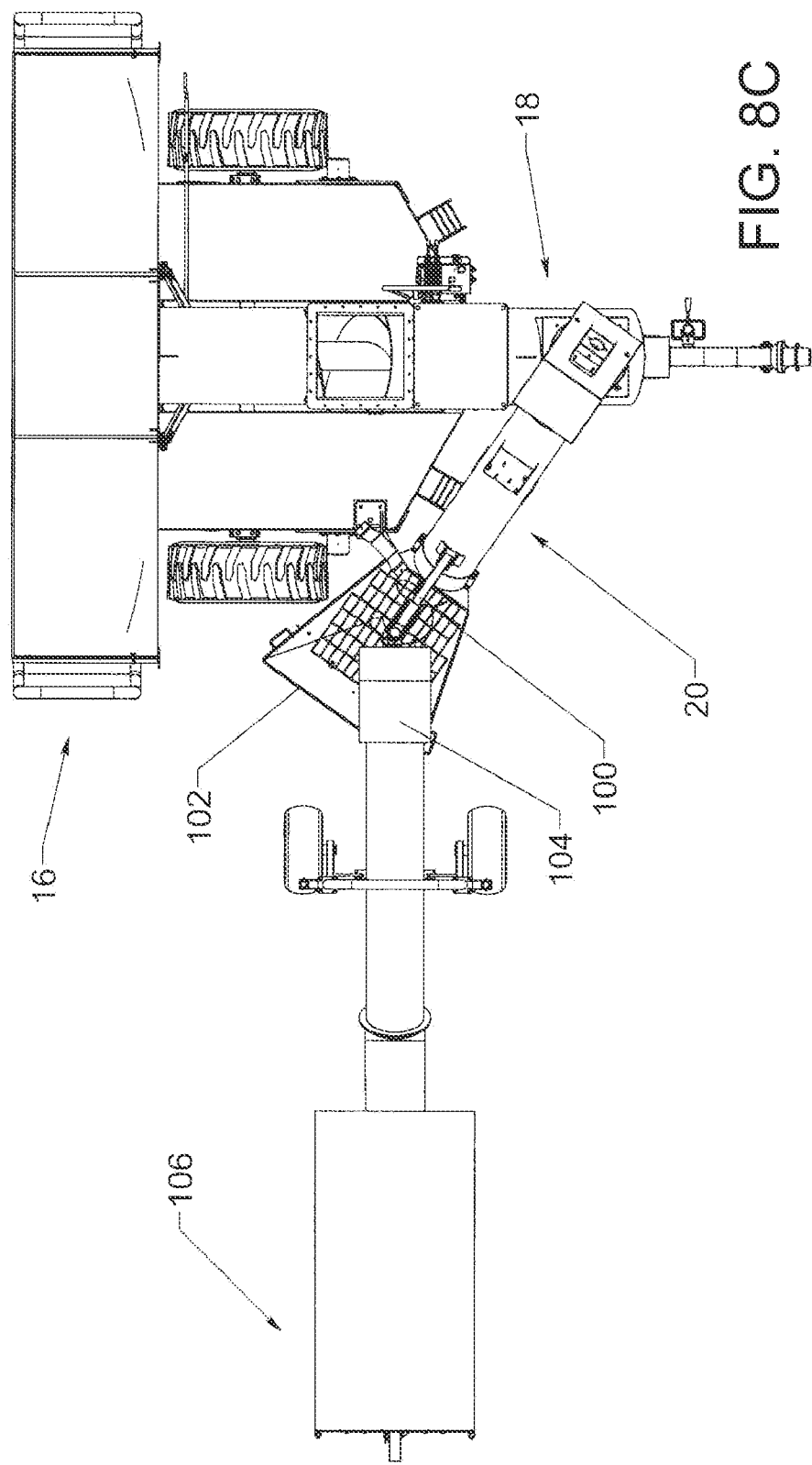

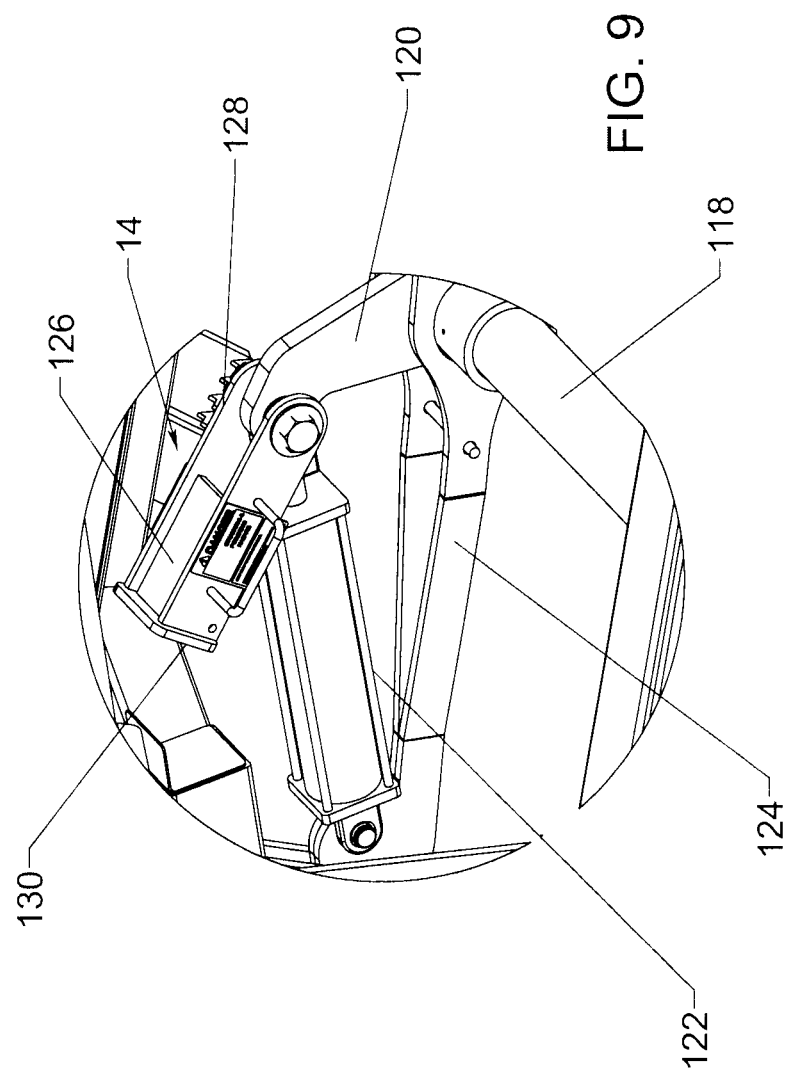

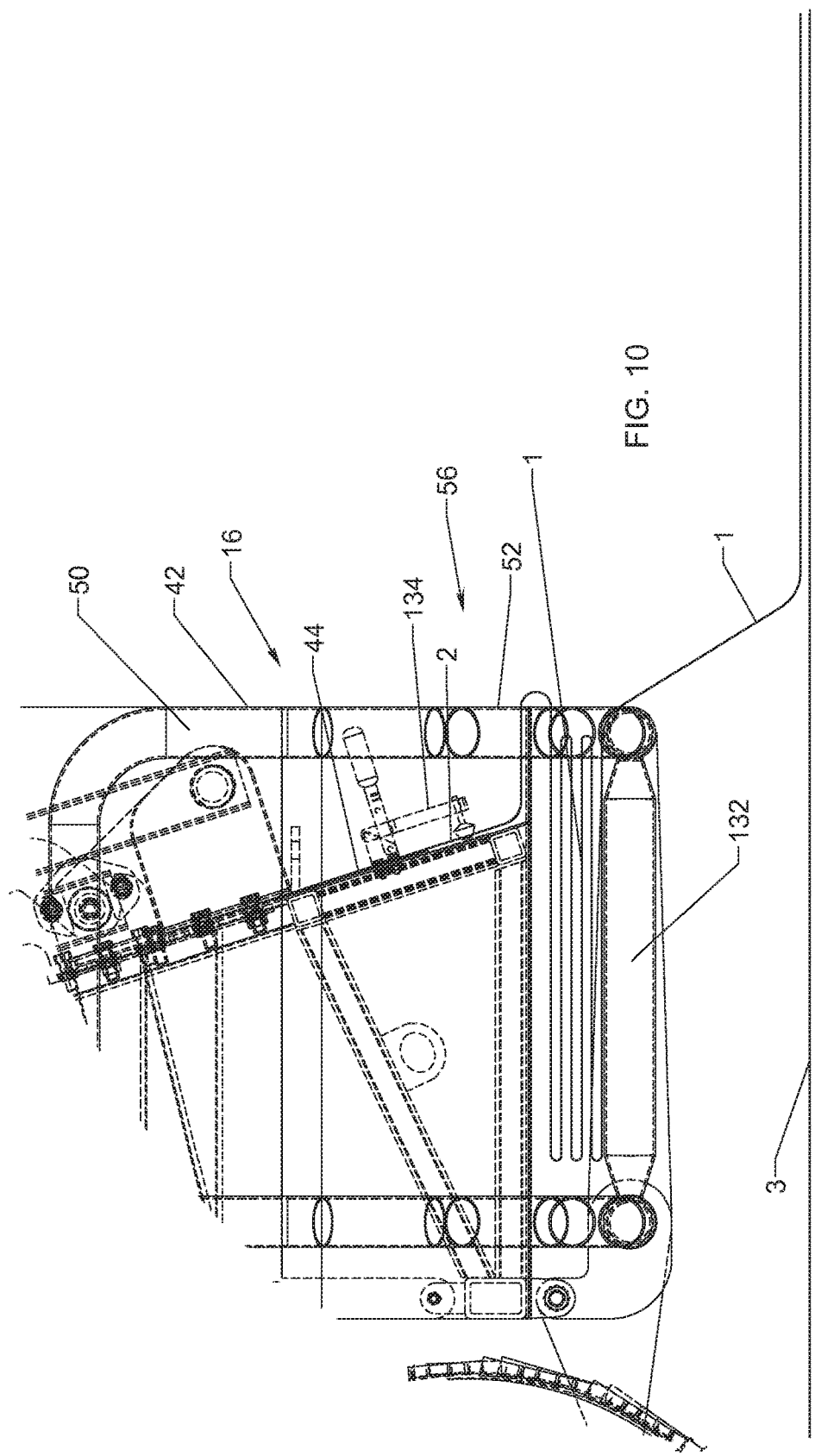

GRAIN STORAGE BAG LOADER APPARATUS

BACKGROUND

Field

The present disclosure relates to grain bag loaders and more particularly pertains to a new grain storage bag loader apparatus with a highly versatile and functional design providing greater ease of use and efficiency of use.

Description of the Prior Art

The storage of materials, such as grains, in large bags of lengths up to 500 or more feet on the ground surface in a field is an increasingly popular way to store materials in a protected manner for short and long periods of time. The loading of the materials into, and subsequent unloading of the materials from, the interior of the bags can be difficult due to the weight of the unfilled bags resulting from the significant lengths and heavy walls of the bags. Further, the movement of the grain materials from the harvesting or transporting vehicles to the bag can require a number of specialized apparatus used together which adds to the cost of using such bags and the difficultly of assembling all necessary parts of the system in the field where the bag is to filled with the material. In some cases, using existing technologies, the convenience and cost savings of using the bags for storage may be outweighed by the cost of the equipment necessary for use of the bags as well as the difficulty in preparing and filling the bag.

SUMMARY

In view of the foregoing disadvantages inherent in the known types of grain bag loaders now present in the prior art, the present disclosure describes a new grain storage bag loader apparatus which may be a highly versatile and functional design providing greater ease of use and efficiency of use.

The present disclosure relates to a bag loader apparatus for filling an elongated bag. The bag loader apparatus may comprise a base assembly having a front and a rear, and a bag interface assembly for removably mounting a bag thereon. The bag interface assembly may form a tunnel with a rear opening for placing in fluid communication with a fill opening of the bag, and may include a bulkhead wall and a bag flange extending generally rearwardly from the bulkhead wall. A primary auger assembly has a first end and a second end with an output opening in communication with the tunnel of the bag interface assembly. A bag mounting assembly may be configured to lift a bag onto the bag loader apparatus into a position for loading the bag by the apparatus.

In another aspect, the disclosure relates a bag loader apparatus for filling an elongated bag. The bag loader apparatus may comprise a base assembly having a front and a rear, and a bag interface assembly for removably mounting a bag thereon. The bag interface assembly may form a tunnel with a rear opening for placing in fluid communication with a fill opening of the bag. The bag interface assembly may include a bulkhead wall and a bag flange extending generally rearwardly from the bulkhead wall. A primary auger assembly may have a first end and a second end with an output opening in communication with the tunnel of the bag interface assembly. At least one bag securing element on the bag interface assembly may be configured to secure an end portion of the bag to a lower portion of the bag interface assembly.

In yet another aspect, the disclosure relates a bag loader apparatus for filling an elongated bag. The bag loader apparatus comprises a base assembly having a front and a rear, and a bag interface assembly for removably mounting a bag thereon. The bag interface assembly may form a tunnel with a rear opening for placing in fluid communication with a fill opening of the bag. The bag interface assembly may include a bulkhead wall and a bag flange extending generally rearwardly from the bulkhead wall. A primary auger assembly has a first end and a second end with an output opening in communication with the tunnel of the bag interface assembly. An auxiliary auger assembly may be configured to feed material into the primary auger assembly, with the auxiliary auger assembly being carried on the base assembly.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 8A is a schematic perspective view of the loader apparatus, according to an illustrative embodiment, showing the auxiliary auger assembly and the truck sump receiving auger assembly in an initial positioning.

FIG. 8B is a schematic perspective view of the loader apparatus, according to an illustrative embodiment, showing the auxiliary auger assembly and the receiving auger assembly in an intermediate positioning.

FIG. 8C is a schematic perspective view of the loader apparatus, according to an illustrative embodiment, showing the auxiliary auger assembly and the receiving auger assembly in a later positioning.

FIG. 9 is a schematic partial perspective view of the loader apparatus, according to an illustrative embodiment, showing elements of the height adjustment assembly.

FIG. 10 is a schematic side sectional view of a lower portion of the loop of the accordion-folded bag positioned adjacent the bag interface assembly with a portion of the bag being attached to the bag interface assembly in a positive manner.

DETAILED DESCRIPTION

Figure 1:
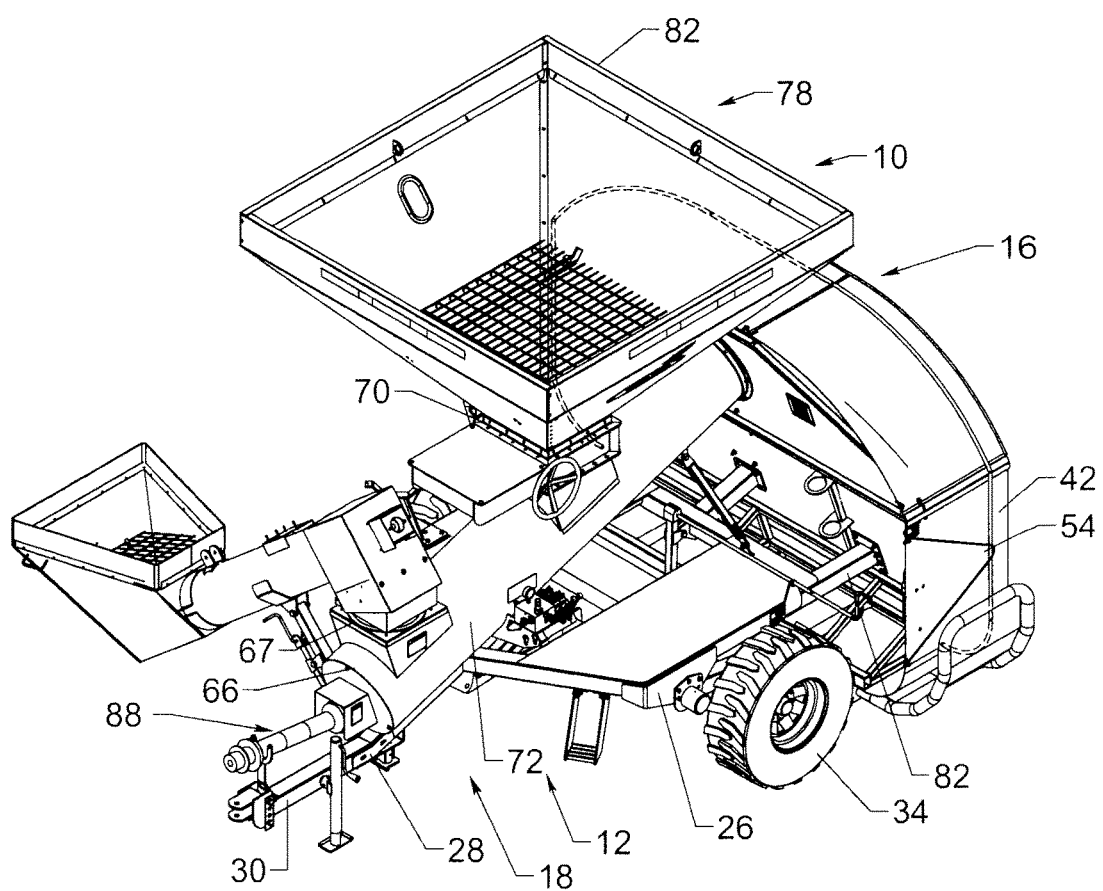
FIG. 1 is a schematic forward perspective view of a new grain storage bag loader apparatus according to the present disclosure.
Figure 2:
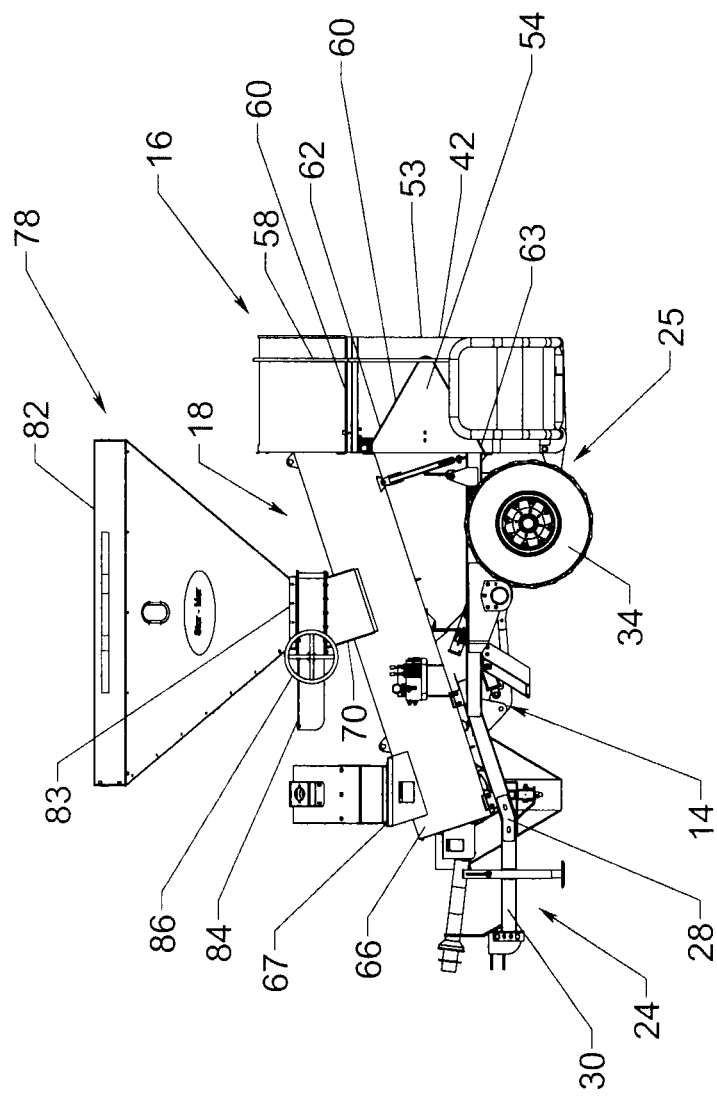
FIG. 2 is a schematic side view of the loader apparatus, according to an illustrative embodiment.
Figure 3:
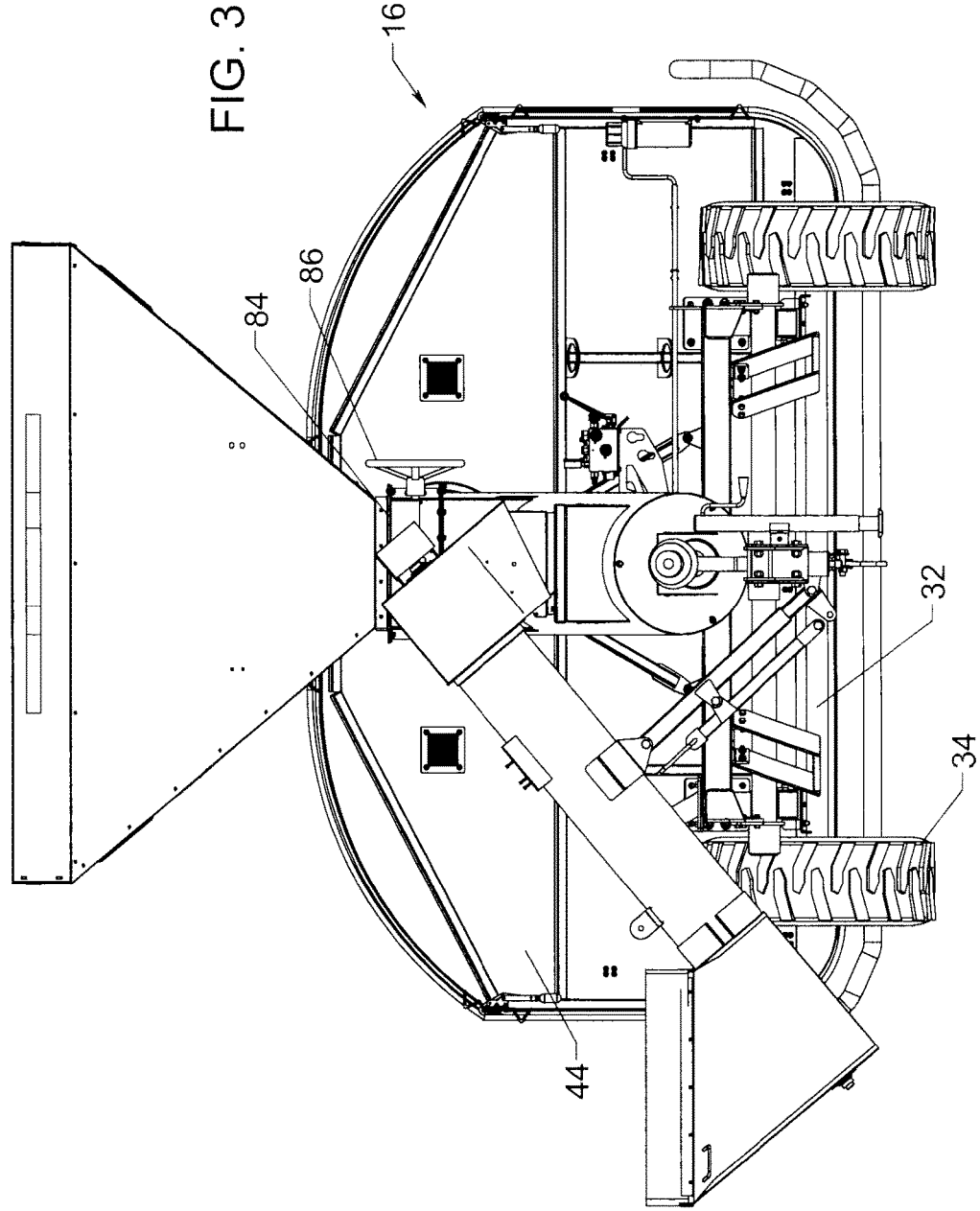
FIG. 3 is a schematic front view of the loader apparatus, according to an illustrative embodiment.
Figure 4:
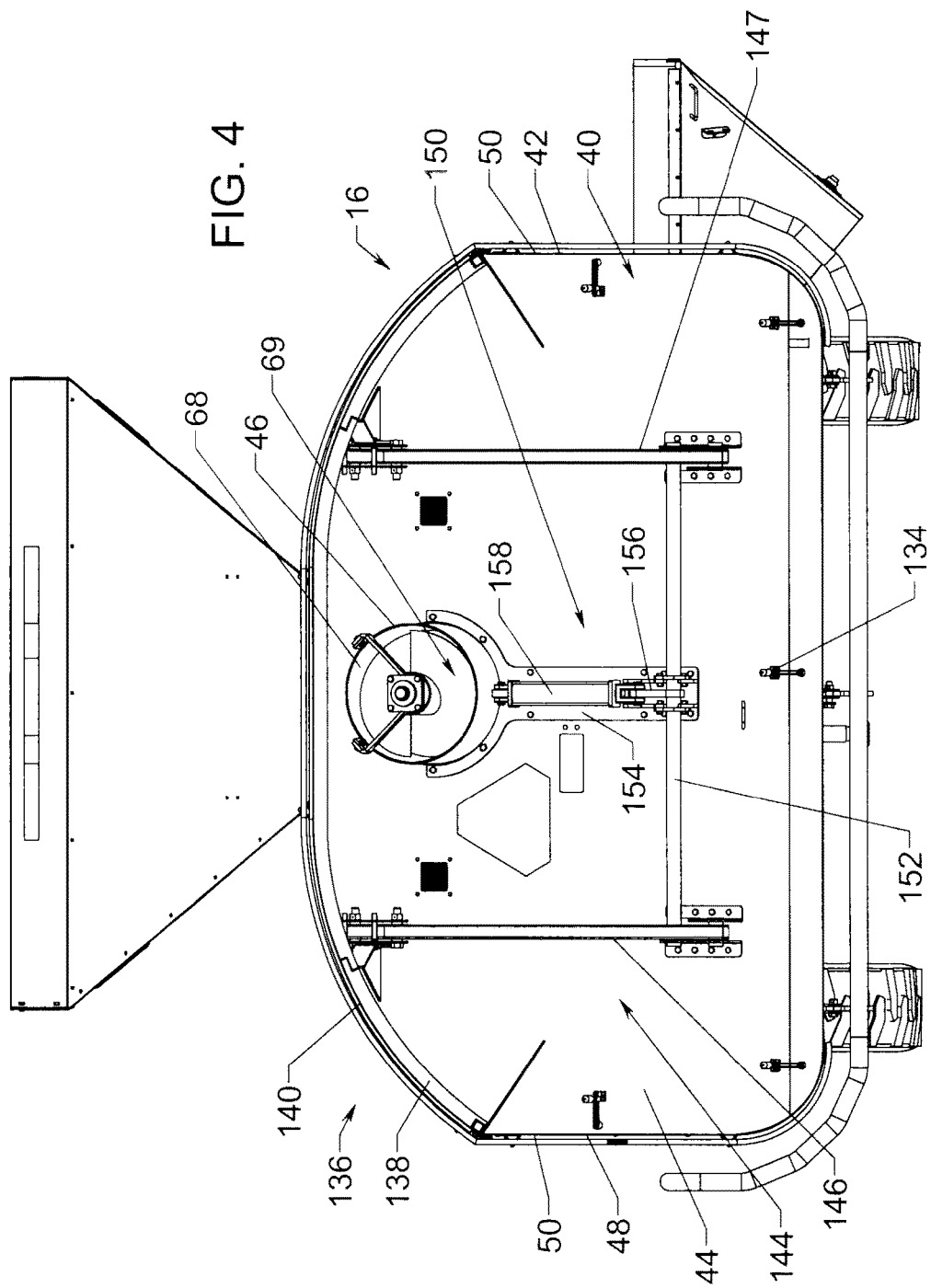
FIG. 4 is a schematic rear view of the loader apparatus, according to an illustrative embodiment.
Figure 5:
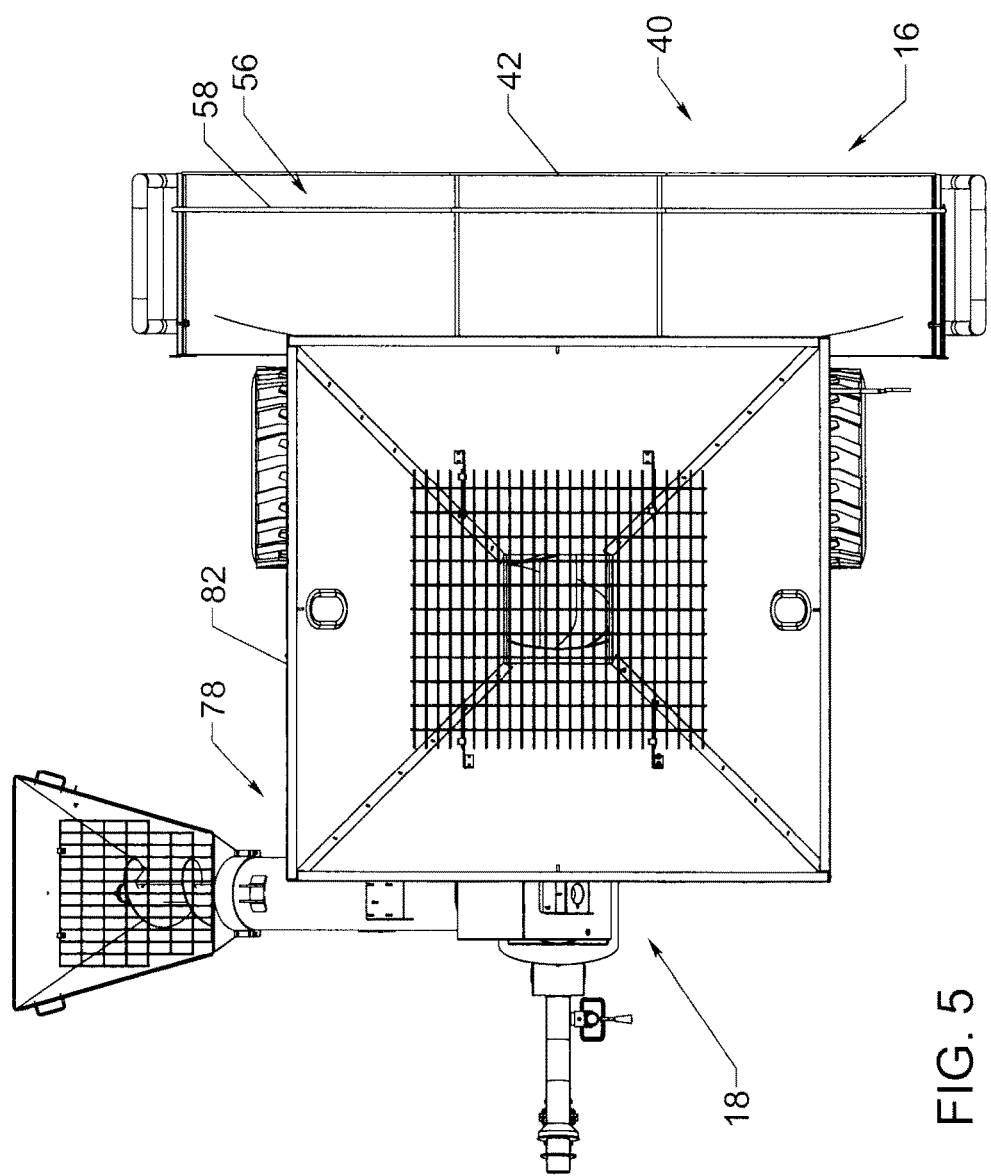
FIG. 5 is a schematic top view of the loader apparatus, according to an illustrative embodiment.
Figure 6:
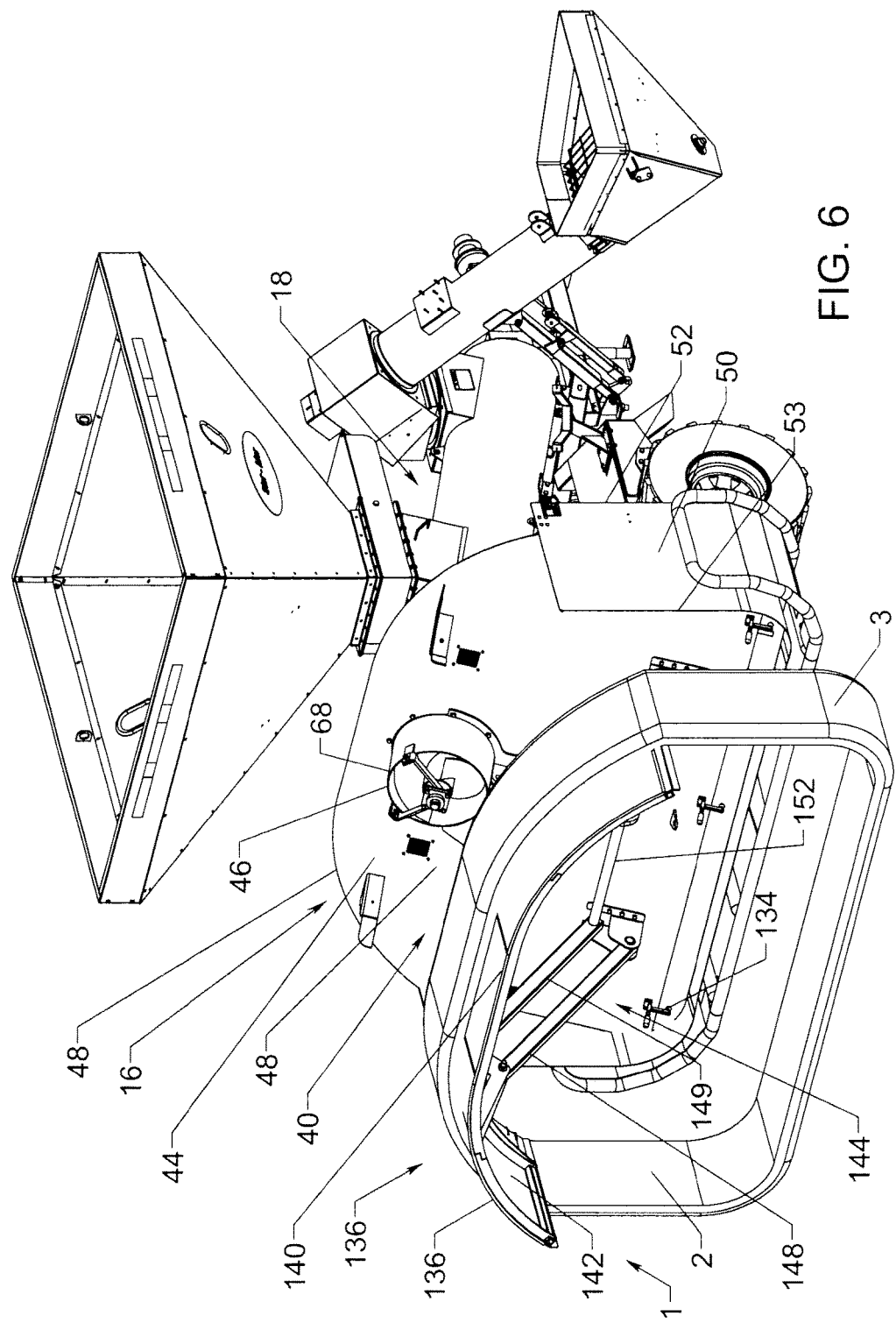
FIG. 6 is a schematic rearward perspective view of the loader apparatus, according to an illustrative embodiment.
Figure 7A:
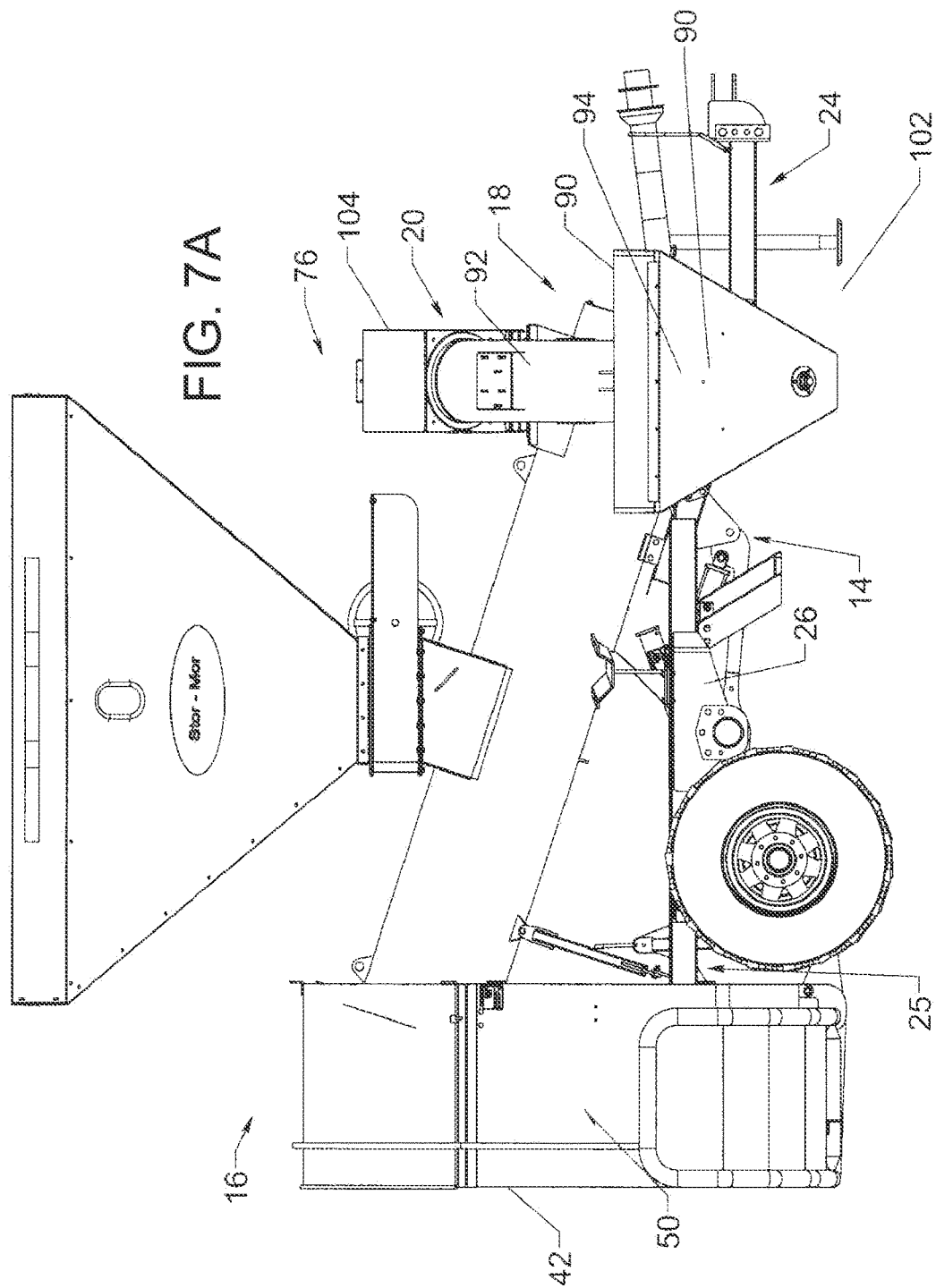
FIG. 7A is a schematic perspective view of the loader apparatus, according to an illustrative embodiment, showing the auxiliary auger assembly in a use position.
Figure 7B:
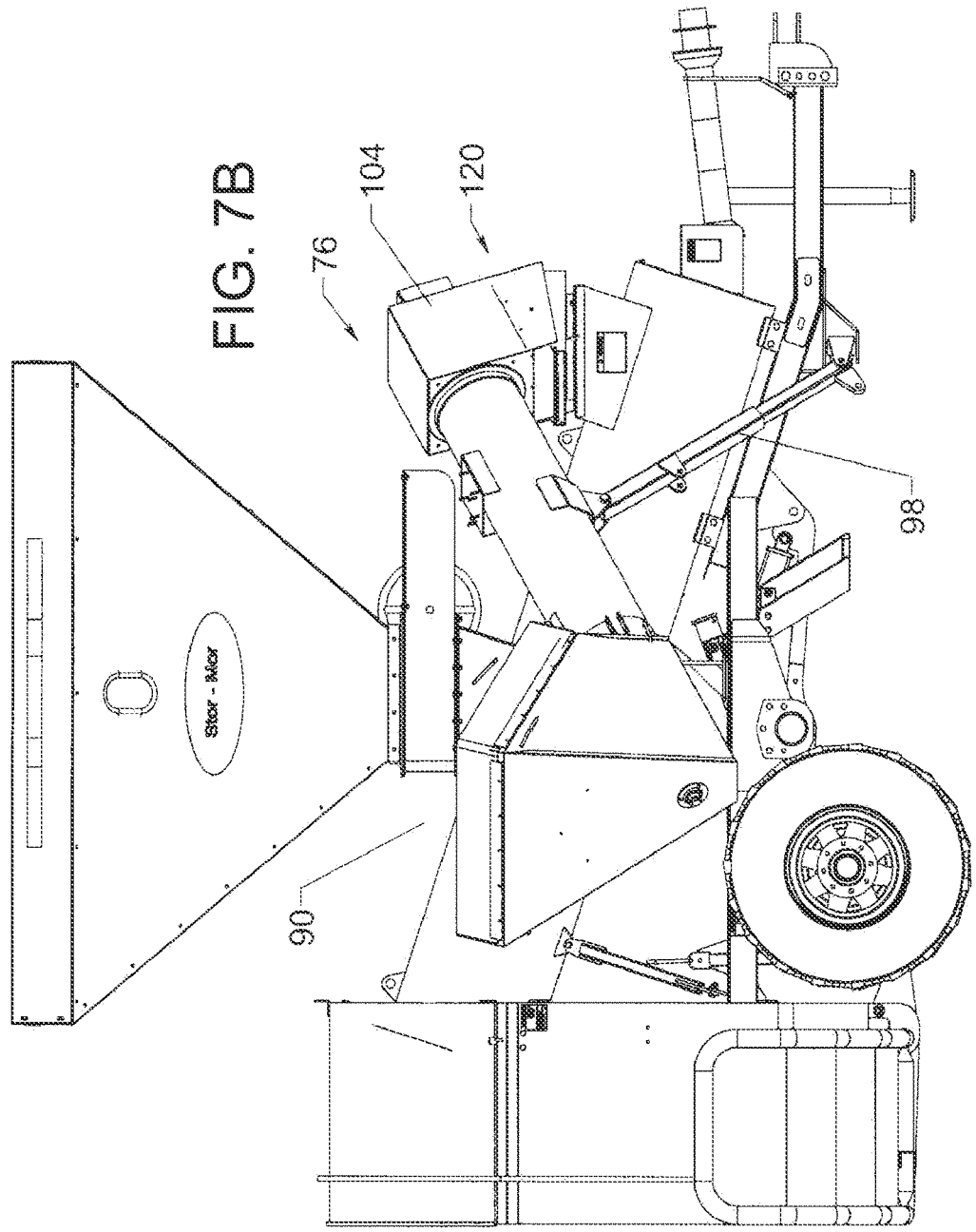
FIG. 7B is a schematic perspective view of the loader apparatus, according to an illustrative embodiment, showing the auxiliary auger assembly in a use position.

With reference now to the drawings, and in particular to FIGS. 1 through 10 thereof, a new grain storage bag loader apparatus embodying the principles and concepts of the disclosed subject matter will be described.

The disclosure relates to a bag loader apparatus 10 that is highly suitable for filling an elongated bag 1. The bag 1 is typically formed of a flexible material with relatively low air permeability. The bag is typically filled with a crop material that needs to be isolated from elements of the environment such as air and moisture for a period of time. The bag 1 has opposite ends, and a first one 2 of the ends may be configured with a fill opening 2 into which material is inserted or pushed into the interior of the bag, and the a second one 3 of the ends may be configured with a closure opposite the opening 2 to hold in the contents as the bag is being filled. The bag may be received in a condition in which both ends are open, and the bag forms a loop (see FIG. 6) with sections of the bag wall being accordion folded so that the effective length of the bag in the accordion-folded condition is approximately 12 inches to 36 inches. The bag end that typically forms the closure is typically the outermost folded section of the accordion-folded loop, and the bag end that forms the fill opening is typically the innermost folded section of the accordion-folded loop (see FIG. 10). The unfolded length of the bag can be up to 500 feet or more in length between the opposite ends, and is often utilized in a field from which the crop material has been removed.

Generally, such as is shown in FIGS. 1 through 6, the bag loader apparatus 10 may generally include a base assembly 12, a height adjustment assembly 14, a bag interface assembly 16, and a primary auger assembly 18. In some embodiments, the loader apparatus 10 may also include an auxiliary auger apparatus 20 and a truck sump receiving assembly 22.

In greater detail, the base assembly 12 has a front 24 and a rear 25 with respect to the direction of movement of the apparatus 10 when the apparatus is employed to fill a bag. The base assembly 12 may comprise a base frame 26 with a forward portion 28 and a rearward portion 29. The forward portion 28 of the frame 26 may form a trailer tongue with a towable hitch 30 which may be hitched to a vehicle such as a tractor for the purpose of moving the apparatus over the road between locations of usage, as well as for moving the apparatus 10 forwardly as the bag is filled and a further portion of the interior of the bag needs to be opened and filled. The base assembly may also include an axle 32 that is mounted on the frame, and a pair of wheels 34 mounted on the axle that permits the apparatus 10 to be towed.

The bag interface assembly 16 is configured for removably mounting a bag 1 onto the interface assembly, and a portion of the bag interface assembly may be partially inserted into the fill opening of the bag. The bag interface assembly 16 may form a tunnel 40 with a rear opening 42 for connecting to, and placing in fluid communication with, the fill opening 2 of the bag. The rear opening 42 may be elongated in a horizontal and lateral direction. The bag interface assembly 16 may comprise a bulkhead wall 44 that may extend transversely of the base frame, with one side of the bulkhead wall being forward facing and another face of the wall 44 being rearwardly facing. The bulkhead wall 44 may have an auger opening 46 for receiving material from the primary auger assembly 18. The bulkhead wall 44 has a perimeter 48.

The bag interface assembly 16 may further comprise a bag flange 50 that extends from the bulkhead wall 44 in a rearward direction, and the flange 50 may extend substantially perpendicular to the plane of the bulkhead wall. The bag flange 50 may extend along the perimeter 46 of the bulkhead wall, and may extend substantially continuously along the perimeter of the bulkhead wall as well as being substantially continuously united to the wall 44 at a forward end 52 or edge of the flange to form a seal against material escape from the bag being filled. The bag flange 50 may have a rear end 53 or edge that forms or defines the rear opening 42 of the tunnel. The bag flange 50 has an outward surface 54 against which the interior surface of the bag may be positioned as the bag interior is being filled.

A bag securing structure 56 of the bag interface assembly 16 may be provided to secure a bag 1 to the bag interface assembly, and may help secure some portions of the bag to the bag flange 50. The securing structure may hold a portion of the bag in a close relationship to, and may hold the bag in abutment against, the outward surface 54 of the bag flange 50 to resist or block the material moving into the bag from escaping from the interior of the bag between the bag and the bag flange.

The bag securing structure 56 may include a perimeter band 58 that extends along the bag flange, and may be positioned against the outward surface 54 of the bag flange when a bag is not mounted on the bag flange. The perimeter band 58 may be biased inwardly against the bag flange such that the positioning of a portion of the bag between the band 58 and the outward surface 54 tends to press the bag against the bag flange. The perimeter band 58 may be continuous along substantially the entire bag flange, and may be an endless loop. The perimeter band 58 may be formed of a resiliently elastic material and may be at least slightly elongated when positioned against the bag flange such that the resilient elasticity of the perimeter band tends to press the band against the outward surface. To assist in locating the perimeter band 58 on the flange 50, a plurality of positioning straps 60 may be utilized to hold the perimeter band in a position along the bag flange against rearward movement that would tend to move the band off of the flange 50. Each of the positioning straps 60 may be looped about a portion of the perimeter band, and the positioning straps may be positioned along the perimeter of the bag flange such that the straps engage spaced portions of the band 58. Each of the positioning straps may have a pair of opposite ends 62, 63, and a first end 62 of a positioning strap may be mounted to the bulkhead wall or bag flange at a location that is spaced from a location at which a second end 63 of the strap is mounted on the bulkhead wall or bag flange. Each of the ends of the positioning straps may be mounted on the bulkhead wall or bag flange at locations forward of a desired position of the perimeter band 58 on the flange 50 such that the positioning straps bias the perimeter band forwardly on the bag flange when the positioning straps are intertwined with the perimeter band. A hook may be mounted on one or both of the ends of the positioning straps to mount the positioning straps on the bulkhead wall or bag flange. The hooks may be releasable from their mounting on the bulkhead wall or bag flange upon the application of a force greater than a predetermined level to the hook by the positioning strap, such as by the perimeter band acting on one of the positioning straps.

The primary auger assembly 18 may be provided for moving material from one or more feed points to the bag interface assembly, and into the interior of the tunnel. The primary auger assembly 18 may have a first end 66 with a first input opening 67, and a second end 68 with an output opening 69. The primary auger assembly 18 may also have a second input opening 70 that is positioned between the first 66 and second 68 ends.

The primary auger assembly 18 may comprise a primary housing 72 which may be elongated between the first 66 and second 68 ends of the auger assembly. The primary housing 72 may be substantially cylindrical in shape and encloses an interior. A primary auger 74 may be positioned in the primary housing to move material from the first input opening 67, and the second input opening 70, to the output opening 69 when the auger is rotated.

A primary input structure 76 may be included as a part of the primary auger assembly 18 for guiding material into the first input opening 67, and may be positioned about the primary input opening and mounted on the primary housing at the first end 66 of the primary auger assembly. A secondary input structure 78 may be associated with the second input opening 70 for guiding material into the opening 70. The secondary input structure 78 may be positioned about the secondary input opening, and may be mounted on the primary housing 72 between the first and second ends of the primary auger assembly. The secondary input structure 78 may comprise a fill hopper 80 that opens in an upward direction for receiving material to be fed into the primary auger. The fill hopper 80 may have an interior that is in communication with the second input opening 70 to guide material placed in the fill hopper to the second input opening. The fill hopper 80 may be mounted on the primary housing 72 about the second input opening, and is positioned above the second input opening. The interior of the fill hopper 80 has a cross sectional area which may taper smaller from the top 82 of the fill hopper to the bottom 83 of the fill hopper. The secondary input structure 78 may also include a gate 84 that is configured to selectively prevent material in the fill hopper 80 from moving through the secondary input opening to the primary auger. The gate 84 may be movable between an open position which allows movement of material from the interior of the fill hopper into the interior of the primary housing, and a closed position in which the gate substantially blocks movement of material from the interior of the fill hopper to the interior of the primary housing. An operating handle 86 may be provided for operating the gate 84 between the open and closed positions. Advantageously, the gate 84 permits the user to meter or slow the flow of grain from the fill hopper into the primary auger, as well as close the opening if the second input opening 70 is being utilized for feeding the primary auger to prevent, for example, debris from entering the primary auger. Further, should the primary auger be stopped while grain remains in the fill hopper, the ability to close the gate 84 may facilitate the restarting of the primary auger without the pressure of the contents of the fill hopper bearing upon the primary auger.

The primary auger assembly 81 may comprise a power take-off structure 88 that is configured to link the primary auger 74 to a power take-off connector of a vehicle. The power take-off structure may extend forwardly from the primary auger and the primary housing, and may extend over the trailer tongue and hitch 30 of the base frame.

Significantly, at least some embodiments of the bag loader apparatus 10 may include the auxiliary auger assembly 20 for feeding material into the primary auger assembly 18 from locations and positions different than the primary input structure. Significantly, the auxiliary auger assembly 20 is carried on the base frame, and may be supported by the base frame (as well as other elements of the apparatus 10) such that the auger assembly 20 moves with the apparatus 10 as a unit. Thus, a separate auger does not need to be transported along with apparatus 10 to the location that a bag is to be filled. In many cases, the auxiliary auger assembly 20 may be sufficient for retrieving grain from a source to feed the primary auger assembly, and in other cases the auxiliary auger assembly may be used in conjunction with yet another auger (such as is described elsewhere in this description). Ease of use may be enhanced by the ability to adjust the intake end of the auxiliary auger assembly so that the point of entry of the grain is not fixed in relation to the rest of the apparatus 10 and may be adjusted to some degree. The auxiliary auger assembly 20 has an input end 90 for receiving material to be carried by the auxiliary auger and an output end 92 for dispensing material carried by the auxiliary auger assembly. The auxiliary auger assembly 20 may be movable between a storage position (see FIG. 7) and one or more use positions. The storage position is suitable for transport of the apparatus on the road, and the use position is suitable for receiving material from locations that are laterally adjacent to the apparatus. The auxiliary auger assembly 20 may comprise an auxiliary housing 94 that may be elongated and substantially cylindrical in shape, and which defines an interior. The auxiliary housing 94 may be movable, and may be pivotable, with respect to the base assembly 12, to permit the movement of the auxiliary auger assembly 20 between the storage and use positions. The auxiliary auger assembly 20 may also comprise an auxiliary auger 96 that is positioned in the auxiliary housing and is able to rotate with respect to the housing to move material between the ends of the housing.

For support of elements of the auxiliary auger assembly 20, a support strut 98 may be utilized in the assembly 20 to support, for example, the auxiliary housing 94 on the base assembly 12. The support strut 98 may be pivotally mounted on the base frame 12 and may also be pivotally mounted on the auxiliary housing 94 to permit the movement of the auger assembly 20 between the storage and use positions. In some implementations, the length of the strut 98 may be adjustable. Optionally, the auxiliary auger assembly 20 may further comprise a support wheel (not shown) that is configured to selectively support the auxiliary housing 94 on a ground surface, such as when the auxiliary auger assembly is in the use position, and may be removed from contact with the ground surface when the auger assembly 20 is in the transport position. The support wheel may be mounted on the auxiliary housing, and may be located toward the input end 90 of the assembly 20 for supporting the input end above the ground surface.

An auxiliary fill hopper 102 may be positioned at the input end 90 of the auxiliary auger assembly for receiving material to be transported by the auxiliary auger assembly to the primary auger assembly. The auxiliary fill hopper 102 may be mounted on the auxiliary housing in a manner such that the auxiliary auger 96 pulls material from an interior of the fill hopper 102 into the interior of the auxiliary housing toward the output end 92 of the assembly 20. The auxiliary auger assembly 20 may also include a dispensing hood 104 that is positioned at the output end 92 of the auxiliary auger assembly for guiding material that exits the output end. The dispensing hood 104 may be positioned above the primary input structure 76 such that material carried by the auxiliary auger is dropped into the primary input structure to be carried by the primary auger 74.

The truck sump receiving assembly 22 may be configured to receive material at a location adjacent to the ground surface and relatively proximate to the base assembly 12 so that, for example, the hopper of a truck may be unloaded downwardly onto the assembly 22 and carried upward to another location, such as the auxiliary fill hopper. The sump receiving assembly 22 may be configured to rest on the ground surface, although this is not a critical feature.

The sump receiving assembly 22 may comprise a receiving structure 106 that is restable on the ground surface to provide to relatively low vertical profile that permits the structure 106 to be positioned below the hopper output of a truck. The receiving structure 106 may comprise a receiving tray 108 that has an upper surface on which material may be deposited from the hopper outlet. The receiving structure 106 may also include a plurality of wheels 110 providing support to the sump receiving assembly 22 on the ground surface, and in some embodiments, each of the wheels comprises a caster-type wheel.

A receiving auger assembly 112 may be included in the sump receiving assembly 22 to draw in material in the receiving tray 108. The receiving auger 112 may having a lower end 114 positioned at the receiving tray and an upper end 116 for dispensing the material carried by the auger. The upper end 116 may be positionable above the fill hopper 102 of the auxiliary auger assembly 20 in order to dispense material into the fill hopper. The lower end 114 may be positioned adjacent to the upper surface of the tray on which material may be positioned by dropping out of the hopper of a truck.

In at least some embodiments, the sump receiving assembly 22 may be releasably linked to the auxiliary auger assembly 20 so that the sump receiving assembly 22 is able to follow the movement of the auxiliary auger assembly 20 as the bag loader apparatus 10 is moved forwardly by the volume of grain filling the bag. Movement of grain into the interior of the bag tends to move the apparatus 10 forwardly without assistance of a prime mover, which can disrupt the positioning of the various elements that are utilized to supply the primary augur with grain. As best shown in FIGS. 8A, 8B, and 8C, which shows the positioning of the various elements as the apparatus 10 moves forwardly, the receiving tray 108 of the truck sump receiving assembly 22 is able to remain relatively stationary to receive grain from the unloading vehicle while the other elements adjust to the movement of the base assembly 12 of the bag loader apparatus 10. A linkage 100 may be employed to releasably link the sump receiving assembly 22 to the auxiliary auger apparatus 20, and may extend from adjacent to the input end 90 of the auxiliary auger apparatus and the dispensing hood 104 of the sump receiving assembly 22. In some embodiments, the linkage 100 includes a ball and socket elements that permits an enhanced degree of freedom of movement of the elements with respect to each other. The linkage 100 may remove the need for having a person monitor and reposition the dispensing hood 104 and the input end 90 as the base assembly 12 of the apparatus 10 is moved forward by the filling of the bag while the grain unloading vehicle remains stationary.

The height adjustment assembly 14 may be provided on the apparatus 10 for adjusting a height of the base frame 26 (as well as other elements mounted on the base frame) above the ground surface on which the wheels of the base assembly 12 rest. It may be desirable to lower the position of the base frame, and the elements mounted on the base frame, relative to the ground surface, when a bag is being loaded, and it may also be desirable to raise the base frame with respect to the ground for greater ground clearance when the apparatus is to be transported, such as on a road or highway. In the illustrative embodiment, a rotatable beam 118 is employed to raise and lower the mounting points of the axle (or the suspension, if utilized) relative to the base frame. The rotatable beam extends in a substantially lateral direction between the mounting points. An actuating lever 120 is attached to and extends radially outwardly from the rotatable beam, such that force applied to the lever tends to rotate the beam 118 in one direction to raise the mounting points, and in another direction to lower the mounting points, with respect to the base frame. In some embodiments, the element acting on the lever 120 to provide the force is a telescopic actuator 122, such as, for example, a combination hydraulic actuator having a cylinder and ram. The telescopic actuator 122 is mounted on the lever and on a mounting point on the base frame 26. A linking member 124 may connect the beam to the base frame adjacent to the actuator while allowing the beam 118 to freely rotate with respect to the linking member 124 and the base frame 26.

One significant optional feature is an auxiliary support member 126 that acts to support the base frame 26 in the raised position without having to rely upon the actuator to support the structure in either position, and thus the actuator 122 simply acts to move the structure between the position corresponding to the raised position and the position corresponding to the lowered position. As can be seen in FIG. 9, a proximal end 128 of the support member is pivotally mounted on the lever 120 at a position at or near the exposed end of the piston rod of the actuator 122, and thus is pivotable with respect to the rod and the actuator. In a first position, the support member 126 is pivoted such that the distal end 130 of the support member is positioned adjacent to and abuts against the head end of the cylinder barrel of the actuator 122 to assist in holding the actuator in a telescoped condition without relying primarily on hydraulic pressure inside the cylinder, which secures the actuator 122 against retraction should the hydraulic system bleed down while the actuator is extended, and reduce pressure in the hydraulic system due to forces acting on the piston rod as the apparatus is moved across the ground. The support member may be positioned about the piston rod in the first position, and may extend through an opening in a plate forming the distal end of the support member. The force applied to the lever is thus transferred from the cylinder (from its mount on the base frame) to the support member to the lever, without being transferred through the piston rod.

Another significant feature of the bag securing structure 56 of the apparatus 10 is the ability to create a positive and direct attachment of the bag to the bag interface assembly. Applicants have recognized that merely pressing or pushing portions of the bag against the outside of the bag loader does not provide an optimum interface between the bag and bag interface assembly, particularly at the lower portions of the interface assembly, as grain filling the bag tends to move between the bag and the bag loader at the lower portions of the bag loader, In such configurations, the weight of the grain piling up inside the bag tends to push and force some of the grain between the loop of the bag and bag loader, allowing the grain to move out of the bag interior and onto the ground, often leaving a trail of grain on the ground beside or underneath the filled bag. The spilled grain tends to attract animals such as mice that would not otherwise be attracted to the filled bag, or its contents, and once the mice have consumed the spilled grain they may be tempted to investigate the interior of the bag and may consume and damage the grain inside.

A positive attachment of the bag to the bag interface assembly, especially at the lower portions of the bag and the bag interface assembly, provides a more suitable interface against leakage and actually utilizes the weight of the accumulating grain to hold the bag in place without significant leakage. In some embodiments, means may be used for holding a portion of the bag on the bag interface assembly until sufficient grain has accumulated to hold the desired portions of the bag against the bag interfaces assembly at which point the function of the holding means may be negligible. Such holding means may be used in combination with a bag tray 132 that supports the lower extent of the bag loop adjacent to the bottom of the perimeter of the bulkhead wall, but the bag tray is not relied upon to hold the bag loop close enough to the bag interface assembly to prevent grain leakage. The positive attachment of the bag to the lower portions of the bag interface assembly tends to resist the grain from moving into the accordion-folded sections of the bag that have yet to be unfolded for filling, although even if such movement does occur, it does not result in grain leaking from the bag.

These advantages may be provided by positively attaching portions of the bag along its perimeter to the interface assembly, such as is shown in FIG. 10. Significantly, the portion of the bag attached or secured to the bag interface assembly is the portion or portions of the bag located adjacent to the fill opening end of the bag 1, which is positioned on the innermost section of the accordion-folded bag forming the bag loop. In at least some embodiments, a lower portion of the looped bag is attached to the bag interface assembly while upper portions of the looped bag may be held using the perimeter band 58 and positioning strap 60 described herein. In at least some embodiments, portions of the bag are positively attached to the rearward face of the bulkhead wall. Such attachments may be accomplished using a variety of different attachment structures, and in the illustrative embodiment, the bag securing structure 56 includes one or more discrete bag securing elements 134 that secure the bag to the bag interface assembly, although a continuous or substantially continuous attachment may be utilized to attach the innermost section of the accordion-folded bag to the bag interface assembly. Each of the illustrative bag securing elements 134 may grasp a portion of or a location on the wall of the bag and secure it to a location on the bag loader apparatus, such as to the bulkhead wall 44. In the illustrative embodiment, each of the securing elements 134 is located on the rear face of the bulkhead wall 44 and is positioned proximate to the perimeter 48 of the bulkhead wall. When the loop of the unfilled bag is positioned on the bag flange 50, the innermost section of the bag (forming the fill opening) may be drawn away from the rest of the accordion folded bag on the flange 50 to a position adjacent to the rear face of the bulkhead wall at its perimeter 48, and the bag may be secured using the securing elements so that the edge of the bag forming the fill opening is positioned against, or substantially sealed with, the rear face of the bulkhead wall. In the illustrative embodiment, the securing elements 134 are formed by clamps that may be secured in a clamped position by an over-center mechanism, but any suitable device may be used that securely holds a portion of the wall of the bag wall against the bulkhead wall. Significantly, the structure formed by these elements forms a highly effective seal between the tunnel 40 and the bag 1 that resists the escape of the filling material from the interior of the bag through any gap between the bag and the apparatus 10. Once the bag is filled to the desired capacity, then the wall of the bag may be cut close to the bulkhead wall 44 to expose the securing elements 134 so that the securing elements can be released from the remainder of the bag on the apparatus 10.

The bag load apparatus 10 may include a bag mounting assembly 136 that assists in the lifting of the bag 1 into position on the bag flange 50 prior to use of the apparatus 10 for filling the bag. The bag mounting assembly 136 may utilize a lid structure 138 that is movable between a raised operational position (see FIG. 4) and a lowered loading position (see FIG. 6). The lid structure 138 may form a portion of the bag flange 50 when the lid structure is in the raised operational position, and may be moved away from the remainder of the structure of the bag flange 50 when the lid structure is moved into the lowered loading position closer to the ground surface. An upper extent of the loop formed by the accordion-folded wall of the bag 1 may be more easily positioned on the lid structure 138 in the loading position, and the lid structure may be raised into the operational position to move the upper extent to an upper location on the bag flange as the lid structure moves into position in, or adjacent to, the remainder of the bag flange. This movement of the lid structure, and the upper extent of the bag supported thereon, tends to bring the lower extent of the bag into position along the lower portions of the bag flange and into a bag tray positioned below the lower portion of the flange. The lid structure 138 may comprise a support plate that has an upper surface 140 for supporting an upper extent of the bag thereon, and a lower surface 142 located opposite of the upper surface on the support plate. In some embodiments, the support plate may be substantially arcuate in shape such that the upper surface 140 is convex and the lower surface 142 is concave to minimize stress points on the bag when the bag is being lifted and is solely supported on the lid structure.

The bag mounting assembly 136 may also include a lifting structure 144 that is configured to move the lid structure 138 between the loading position and the operational position, and that may be mounted on the bulkhead wall 44. The lifting structure 144 may be configured to maintain the upper surface 140 of the support plate in a uniform orientation when the lid structure is moved between the loading position and the operational position, and preferably the lifting structure maintains the upper surface 140 in a substantially level orientation between the loading position and the operational position. The lifting structure 144 may comprise at least one lifting arm 146, and in some preferable embodiments includes a pair 146, 147 of lifting arms. The lifting arm may be mounted on the bulkhead wall 44 and also on the lid structure 138. The lifting arms 146, 147 may be mounted on the rear face of the bulkhead wall 44 and on the lower surface 142 of the support plate of the lid structure, although this positioning is not critical. The lifting arms may be pivotable with respect to the bulkhead wall and the support plate of the lid structure. Each of the lifting arms 146, 147 may comprise a pair of bars 148, 149 that may be mounted in a parallel link arrangement to the bulkhead wall and the lid structure. The pair 146, 147 of lifting arms may be laterally spaced from each other and mounted to the bulkhead wall and the lid structure at laterally spaced locations.

The lifting structure 144 may also comprise a lifting arm actuation assembly 150 that is configured to actuate the one or more lifting arms 146, 147 to move the lid structure 138 between the loading position and the operational position. In the illustrative embodiments, the lifting arm actuation assembly 150 comprises a pivot rod 152 mounted to one or both of the lifting arms 146, 147 in a manner such that rotation of the pivot rod 152 pivots the lifting arm with respect to the bulkhead wall. The pivot rod 152 may be rotatably mounted on the bulkhead wall. The lifting arm actuation assembly 150 may comprise an actuation structure 154 to actuate the pivot rod 152 to cause rotation of the pivot rod 152 and move the lifting arms 146, 147 to move the lid structure 138 between the loading position and the operational position. The actuation structure may comprise a pivot arm mounted on the pivot rod 152 and may extend from the pivot rod 152. The actuation structure 154 may also comprise an actuator 158 that is configured to act on the pivot arm 156 to rotate the pivot rod 152 by moving the pivot arm 156. The actuator 158 may comprise a telescopic actuator, and may comprise a hydraulic piston and cylinder.

In use, after positioning the apparatus 10 in the field at a location where the filled bag is to be rested, the lid structure 138 may be moved from the raised operational position toward the lowered loading position closer to the ground surface. The bag 1 may be positioned adjacent to the lid structure, and an upper extent of the loop formed by the unfilled bag may be raised up by the user and placed or rested upon the upper surface of the lid structure 138. The lid structure 138 may then be moved, using the lifting structure, from the lowered loading position to the raised operational position using suitable controls, such as hydraulic controls used to control hydraulic fluid movement to the actuator 158. Once the lid structure has reached the operational position and the lid structure forms a portion of the bag flange, then the lower extent of the bag loop may be positioned below the bag flange, and in some cases may be rested upon a bag tray that is positioned below the lowermost extent of the bag flange to support that portion of the bag. The edge of the innermost section of the accordion-folded bag may be drawn away from the rest of the bag, and that portion may be secured to the bulkhead wall of the apparatus using the bag securing elements to hold onto the innermost section of the bag, resisting material movement between the lower portion of the bag flange and the bag which would allow material to escape from the interior of the bag. The outermost section of the accordion-folded bag may be drawn in a rearward direction from the apparatus 10, and the edges of the bag on the outmost section may be secured or held together to close the opening in the end of the bag.

The material may then be moved into the interior of the bag. This may be accomplished by feeding the material directly into the primary auger assembly 18 via the primary input structure 76 by dropping the material into the fill hopper 80, such as by an auger mounted on a wagon or cart. Optionally, the auxiliary auger apparatus 20 may be utilized to load material from the hopper bottom of a trailer into the primary auger apparatus via the secondary input structure. Additionally the truck sump receiving assembly may be utilized to further extend the reach of the auxiliary auger apparatus. Filling of the bag with material by one of these ways tends to push the apparatus in a forward direction as the filled portion of the bag remains stationary, and the material filling the bag pushes against the bulkhead wall.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A bag loader apparatus for filling an elongated bag to rest upon a ground surface on which the apparatus rests, the bag loader apparatus comprising:
   a base assembly having a front and a rear;
   a bag interface assembly for removably mounting the bag thereon, the bag interface assembly forming a tunnel with a rear opening for placing in fluid communication with a fill opening of the bag, the bag interface assembly including a bulkhead wall and a bag flange extending generally rearwardly from the bulkhead wall; and
   a primary auger assembly having a first end and a second end with an output opening in communication with the tunnel of the bag interface assembly;
   wherein the bag interface assembly includes a bag lifting assembly configured to lift the bag into a position for loading the bag by the apparatus, the bag lifting assembly including:
      a lid structure positionable in the bag to suspend and maintain the fill opening of the bag in an open condition, the lid structure having an upper surface on which a portion of the bag rests when the lid structure supports the bag; and
      a lifting structure configured to move the lid structure between a loading position and an operational position;
      wherein the loading position of the lid structure is characterized by the lid structure being located relatively lower and closer to the ground surface on which the apparatus rests and the operational position of the lid structure being characterized by the lid structure being located relatively higher and further from the ground surface;
   wherein the operational position of the lid structure is further characterized by the lid structure being positioned adjacent to the bulkhead wall and forming a portion of the bag flange; and wherein the lifting structure comprises a multiple bar linkage to swing the lid structure between the loading position and the operational position while maintaining the upper surface of the lid structure in an orientation parallel to the ground surface in the loading position of the lid structure and in the operational position of the lid structure.

2. The apparatus of claim 1 wherein the upper surface of the lid structure is substantially arcuate.

3. The apparatus of claim 1 wherein the lifting structure is mounted on and extends from the bulkhead wall into the tunnel of the bag interface assembly.

4. The bag loader apparatus of claim 1 wherein a plurality of bag securing elements are mounted on the bulkhead wall and are configured to secure a portion of the bag to the bulkhead wall in the tunnel.

5. The bag loader apparatus of claim 1 wherein the loading position is further characterized by the lid structure being spaced from the bulkhead wall.

6. The bag loader apparatus of claim 1 wherein the loading position of the lid structure is further characterized by the lid structure being spaced from the bulkhead wall;

wherein the lifting structure is mounted on and extends from the bulkhead wall into the tunnel of the bag interface assembly; and wherein a plurality of bag securing elements are mounted on the bulkhead wall and are configured to secure a portion of the bag to the bulkhead wall in the tunnel.

7. The apparatus of claim 1 additionally comprising a bag support tray positioned below the bag flange and configured to support a lower portion of the bag of the ground surface on which the apparatus rests.

8. The apparatus of claim 1 wherein the bag support tray has a substantially horizontal central portion and opposite end portions which curve upwardly from the central portion along opposite sides of the bag flange.

9. The apparatus of claim 1 wherein the base assembly includes a base frame; and additionally comprising:

a height adjustment assembly for adjusting a height of the base frame with respect to the ground surface on which the apparatus rests to lower a position of the base frame and elements of the apparatus mounted thereon relative to the ground surface when loading the bag and to raise the positon of the base frame and the elements mounted thereon relative to the ground surface for increased ground clearance when the apparatus is transported.

* * * * *